Figure 1:
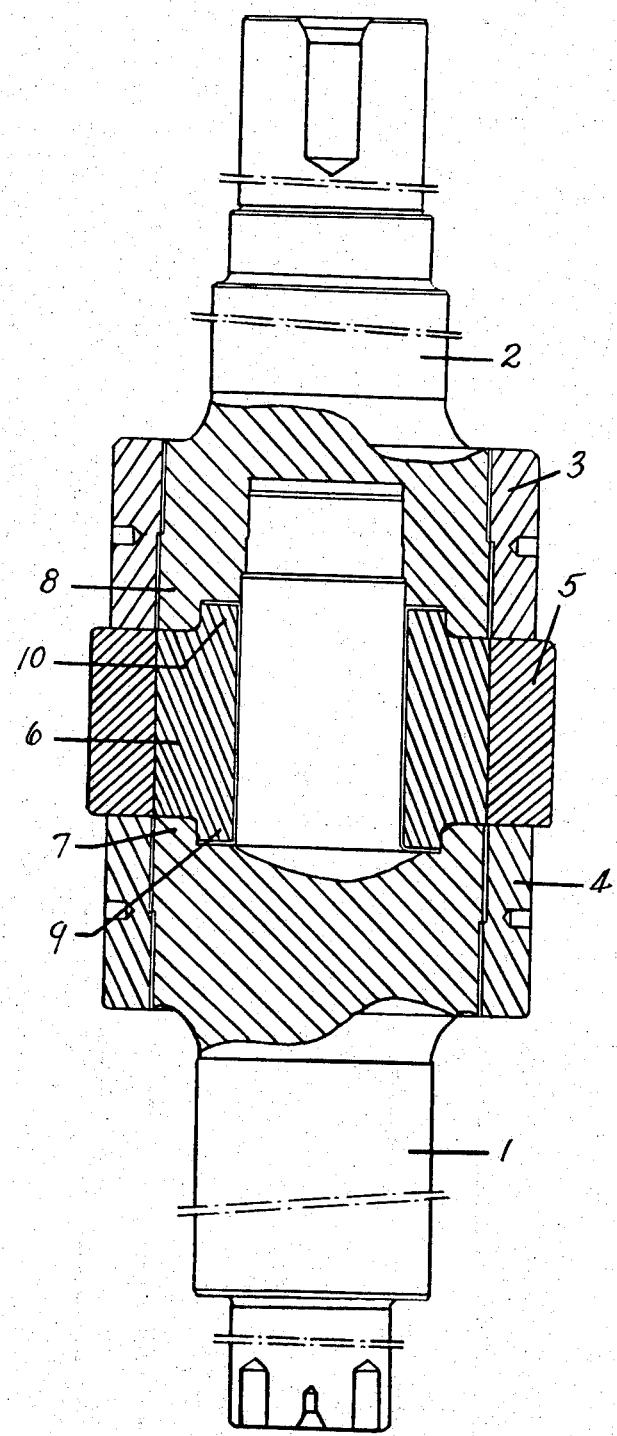

United States Patent [19]
Paulin

[11] 3,833,982
[45] Sept. 10, 1974

[54] METHOD OF MOUNTING RINGS OF HARD SINTERED METAL ON A ROLLING CYLINDER

[75] Inventor: Jean Paulin, St-Martin D'Heres, France

[73] Assignee: Ugine Carbone, Grenoble, France

[22] Filed: May 3, 1973

[21] Appl. No.: 356,845

[30] Foreign Application Priority Data
May 4, 1972 France .............................. 72.15809

[52] U.S. Cl. ................. 29/148.4 D, 29/125, 29/447
[51] Int. Cl. ......................... B21h 1/14, B23p 11/02
[58] Field of Search ................ 29/148.4 D, 447, 125

[56] References Cited
UNITED STATES PATENTS
2,342,159   2/1944   Moran ....................... 29/148.4 D X Primary Examiner—Thomas H. Eager

[57] ABSTRACT

In a device for hot rolling metal wires and strip, a rolling cylinder embodying a supporting ring and a working ring mounted on the cylinder with the supporting ring having a coefficient of expansion approximating that of the working ring and a clearance between its inner periphery and its support with the working ring fitted onto the supporting ring with a clearance of not more than a few hundredths of a millimeter and means engaging the axial portions of the working ring to prevent axial displacement whereby the forces generated under operating conditions operate to apply compressive forces to the working ring.

7 Claims, 2 Drawing Figures

METHOD OF MOUNTING RINGS OF HARD SINTERED METAL ON A ROLLING CYLINDER

This invention relates to the hot-rolling of metal wire or strip.

For this purpose, it has previously been proposed to use rolling cylinders fitted with sintered-carbide rings. However, this has been achieved with machines specially designed, known as no-twist rollers equipped with shafts and cylinders of small dimensions.

The adaptation of working rings of hard sintered metals (carbides) has failed on conventional cylinders due, on the one hand, to their large dimensions and, on the other hand, to the difficulties attributable to the difference in the coefficients of expansion of the material making up the supporting cylinders and the metal carbides. In effect, in service, a rolling cylinder becomes heated from within due to friction in the bearings or roller boxes in which it rotates, and its temperature varies with time.

If a carbide ring is mounted with normal clearance at ambient temperature, it becomes exposed to considerable tensile force after a period of operation due to the fact that the cylinder expands to a greater extent than the surrounding ring. Since sintered carbides are not able to withstand this kind of force, the ring often breaks.

Accordingly, it has been proposed, when mounting the ring at ambient temperature, to provide a clearance designed to compensate for the differences in expansion at the specified working temperature. However, until this temperature is reached, the ring is not adequately held on its support and the rolled product is irregular. If, by contrast, the temperature accidentally undergoes an excessive increase, the ring is again in danger of being broken.

In addition, the different expansions of the cylinder and ring also occur in the axial direction and make it necessary to wedge the cylinder and ring together, resulting in the formation of weak spots in the carbide ring and again subjecting the ring to possible breakage.

In U.S. Pat. No. 2,342,159 (FIG. 5), description is made of a working ring of sintered carbide held by banding inside shoulders of peripheral annular recesses of two half-supports keyed to the shaft. However, the ring is subjected to bending stress and is therefore exposed to the danger of breakage.

It is an object of this invention to produce and to provide a method for producing a rolling cylinder for use in hot rolling of metal wire or strip which is not subject to the problems and deficiencies previously described and in which breakage of the ring is avoided by exposure primarily to compressive forces.

Figure 2:
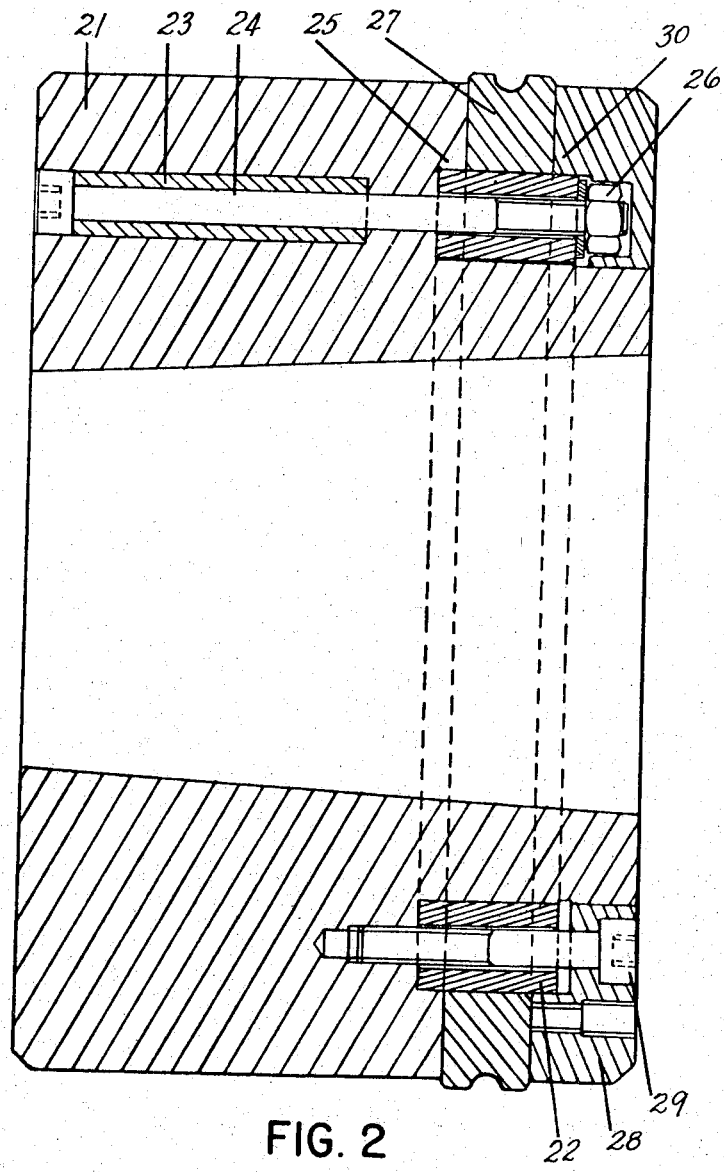

These and other objects and advantages of this invention will hereinafter appear, and for purposes of illustration, but not of limitation, an embodiment of the invention is shown in the accompanying drawings, in which FIG. 1 is an axial view, partially in section of a rolling cylinder embodying the features of this invention; and FIG. 2 is a sectional view through a sleeve fitted onto the end of a rolling cylinder, showing a modification of the invention.

The present invention relates to the mounting of a ring of hard sintered metal, for example a metal carbide, on a rolling cylinder by a method and means which obviates these disadvantages, and to cylinders thus equipped.

In accordance with the practice of this invention, the working ring of hard sintered metal is fitted onto a supporting ring (made of a sufficiently resistant material with a coefficient of expansion similar to that of the working ring) which is held by banding at its ends inside the shoulders of an annular peripheral recess in the shaft, the inner surface of which is not in contact with the shaft.

The supporting ring is preferably formed of a hard sintered metal. It can also be formed of any other material combining very high mechanical strength with a coefficient of expansion identical with or at least very similar to that of the working ring. For example, certain special steels with a very high nickel content are entirely suitable.

The working ring is fitted, with very low clearance, at most a few hundredths of a millimeter, onto an element with a similar coefficient of expansion, whereby one of the disadvantages referred to above is obviated. Since the supporting ring is not itself fitted onto the shaft, but held by compression, up to the working temperature, by the shoulders of the recess directed towards the axis, the risk of ring breakage through expansion of the shaft is eliminated. The annular peripheral recess, in which the supporting ring is banded, is formed between two parts of the shaft which are separated for mounting and then mechanically reconnected.

Each ring is laterally held in position by utilizing the expansion, at the working temperature, of the elements holding the rings in place. The working ring is thus driven by friction without slippage.

By comparison with the mounting of a single ring of a different type, or with the mounting of a single ring in a material capable of withstanding the mounting forces, but with poor qualities for hot-rolling, the two-ring mounting of this invention makes it possible to obtain a strong, effective rolling unit which combines the advantages of the two aforementioned mountings.

In the mounting in accordance with the practice of this invention, the working ring is supported over the entire periphery of its inner surface. It functions solely under compression under the rolling force which is directly absorbed. Accordingly, its working conditions are good by comparison with a working ring without contact around its inner surface and which is held in position by elements applying radial forces directed from the outside in towards the axis and which is therefore subjected to bending forces.

On the other hand, the presence of two rings complementing one another in their functions, enables the working ring to be replaced without difficulty in the event of wear. The cylinder fitted with the supporting ring, which is the most difficult assembly to mount, is left as it stands.

Finally, the regrinding of a simple working ring requires a machine of lower capacity than that which would be needed to accommodate the cylinder-and-ring assembly.

The following examples are given by way of illustration and not by way of limitation of the practice of this invention:

EXAMPLE 1

FIG. 1 is a section through a rolling cylinder equipped in accordance with the invention. The cylinder illustrated is a conventional cylinder, both ends of which are mounted in bearings for turning movement. It is made up of two half-shafts 1 and 2 of 40-NCD-17 steel treated for an ultimate tensile strength of 140 kg/mm, the right hand end 1 screwing into the left hand end 2. The supporting ring 6 of hard, high-strength WC-Co-alloy containing 75 percent by weight of WC, is located in an annular peripheral undercut recess formed between the two half-shafts. The material of which it is formed has a coefficient of thermal expansion of $4.9 \times 10^{-6}$ per °C and a bending strength of 270 hectobars. Its internal diameter is slightly greater than the diameter of the right hand end of the half-shaft 1 which it surrounds. It is held under compression by the shoulders 7 and 8 formed by the narrower outer portions of the recess which cooperate with the lateral shoulders 9 and 10 of the portion of the ring of greater length, adjacent the shaft. The working ring 5, optionally provided with grooves (not shown), is formed of hard WC-Co-alloy containing 85 percent by weight of WC, of the kind commonly used for the hot rolling of steel wire, having a coefficient of thermal expansion of $4.4 \times 10^{-6}$ per °C and a bending strength of 230 hectobars. It is fitted onto the supporting ring 6 and is held against lateral movement by sleeves 3 and 4 of stainless steel, having a high coefficient of expansion and which are screwed respectively onto the half-shafts 2 and 1.

If the working temperature of the cylinder and rings is of the order of 100°C, the separated half-shafts are heated beforehand to 150°C. The supporting ring 6 is fitted cold onto the half-shaft 1 in such a way that the shoulder 9 takes up a position below the shoulder 7. The half-shaft 2 is brought up so that its shoulder 8 rests on the shoulder 10 of the ring, after which it is screwed for joinder to the half-shaft 1. The dimensions of the shoulders of the ring and of those of the half-shafts are designed so that the residual tightening at 100°C is distinctly greater than the difference in expansion between the steel of the half-shafts and the carbide of the ring.

The assembly is then substantially inseparable due to the compressive prestressing which the banded ring undergoes. The outer surface of the supporting ring and the roller bearings of the shaft are then ground between centers to their final dimensions so that they are perfectly coaxial. It then remains to fit the working ring onto the supporting ring with a clearnace of 0.02 mm and to tighten it between the stainless steel bolts screwed onto the half-shafts so that, at working temperature, they can expand in the direction of the working ring which thus functions simultaneously under longitudinal compression and radial compression. The same applies as regards the supporting ring. The conditions are thus the best possible for these two components which are relatively fragile under tensile force.

EXAMPLE 2

FIG. 2 is a sectional view through a sleeve 21 fitted conically onto the end of a rolling cylinder held at one end only, i.e. an overhung cylinder. Under conditions similar to those of Example 1, the carbide supporting ring 22 is mounted in the annular peripheral recess formed between the sleeve 21 and the cover 28 so that it is banded (radial compressive prestressing) by the shoulders 25 and 30 of the sleeve and cover. Its inner surface is not in contact with the sleeve. It is held longitudinally between the sleeve and the nut members 26 of the bolts 24 which extend through sleeves 23 of stainless steel with a high coefficient of expansion, which rest on shoulders of bores through which the bolts pass. When the temperature rises, the difference in expansion between bolts and sleeves causes the sleeves to apply a pulling force to the bolts and the nut members axially compress the supporting ring. After the surface of the supporting ring has been ground in the cold, the working ring 27 is fitted thereon. It is tightened against the sleeve by the cover 28 of stainless steel, having a high coefficient of expansion, which is fixed to the sleeve by screws 29. In this case too, the differential expansion of the sleeve and cover axially compresses the working ring at the operating temperature.

It will be understood that changes may be made in the details of construction and operation without departing from the spirit of the invention, especially as defined in the following claims.

I claim:

1. A method for mounting a working ring of hard sintered metal on a rolling cylinder, comprising placing in an annular peripheral recess in the cylinder a supporting ring made of a material having a coefficient of expansion approximating that of the working ring, with the inner surface having a clearance with the bottom of the recess, and fitting the working ring onto the supporting ring with a clearance of not more than a few hundredths of a millimeter.

2. A method as claimed in claim 1 in which the recess in the cylinder is formed with an inner portion of greater length in the axial direction than the radial outer end portion to provide an overhanging shoulder beneath which the supporting ring is engaged in its mounted relation on the cylinder.

3. A method as claimed in claim 1 in which the supporting ring is formed of a hard sintered metal of high strength.

4. A method as claimed in claim 1 which includes the step of heating the rolling cylinder before placement of the supporting ring and wherein, after the supporting ring has been placed in position, the assembly is allowed to cool, and then grinding the surface of the ring and the cylinder to render them coaxial.

5. A method as claimed in claim 1 which includes the step of axially tightening the working ring onto the cylinder by elements joined to the cylinder having a higher coefficient of expansion than the cylinder so that, at operating temperature, axial compressive stress is applied to the working ring.

6. A rolling cylinder assembly comprising two shaft segments supported by bearings at their opposite ends, means mechanically connecting the shaft segments at their adjacent ends, said joined portions of the shaft segments having recesses which between them define an annular peripheral recess embodying cylindrical shoulders radially spaced from the axis and extending axially in the direction toward each other, a supporting ring of hard sintered metal retained in the recess between shaft segments and confined axially within the shoulders, the inner surface having a clearance from the bottom of the recess, a working ring of hard sintered metal fitted onto the supporting ring, and at least one coaxial sleeve formed of a metal that expands more than the cylinder for axially bracing the working ring connected mechanically on one side of a shaft segment and free to expand on its other side in the direction of the working ring.

7. A sleeve for an overhung rolling cylinder comprising a body portion, a cover made of a metal having a coefficient of expansion greater than that of the body portion, two axially connecting cover screws in engagement with the body portion, a supporting ring of hard sintered metal positioned in an annular peripheral recess formed between the body portion and cover and encased within shoulders of the recess directed toward the axis, tightening ring supporting bolts extending through the sleeve and formed of a metal having a coefficient of expansion greater than the body portion which rest on shoulders of bores through which the bolts pass, and a working ring of hard sintered metal fitted onto the supporting ring and braced axially by the cover against the body portion.

* * * * *